UNITED STATES PATENT OFFICE.

JOSEPH LAMBERT DE MONTOISON, OF MANCHESTER, ENGLAND.

IMPROVEMENT IN TANNING PROCESSES.

Specification forming part of Letters Patent No. 176,606, dated April 25, 1876; application filed March 18, 1876.

*To all whom it may concern:*

Be it known that I, JOSEPH LAMBERT DE MONTOISON, of Manchester, England, have invented certain Improvements in Tanning Skins and Hides, of which the following is a specification:

The invention relates to the depilating, tanning, and preserving of hides and skins—hereinafter termed skins—the objects being to obtain a better result and to expedite the processes.

To depilate the skins the flesh-side is softened with warm water, avoiding wetting the hair, fur, or wool, and is then treated with a solution, at a temperature of about 10° Twaddel. This solution is composed of about fifty parts of hydrosulphate of soda, also termed sulphide of sodium, fifteen parts of sulphide of arsenic, ten parts of crude potash, and twenty-five parts of hydrosulphate of baryta, also termed sulphide of barium, dissolved in one hundred parts of water. This solution is mixed with a solution of one part of fresh hydrate of lime in about four parts of water. The flesh-side of the skin is covered with a layer of this solution, which penetrates the skin very quickly, and the wool, fur, or hair may then be removed in condition as if cut from a live animal.

Pearlash or other form of potash may be used, and other alkali may be used in place of soda, and other form of alkali, soda, potash, or other alkali may be used in lieu of the hydrosulphate, and the solution be treated with sulphureted hydrogen.

The proportions given may be varied as found to be most suitable.

If the skins are to be tanned, the tanning may be effected in the ordinary manner, or by the process forming the second part of the invention. Skins which have been depilated by ordinary means, and have been fleshed and scoured, may also be tanned by this process, and skins may be preserved with the hair or fur on. The skins depilated in the manner hereinbefore described should lie in water for about twenty-four hours before being fleshed and scoured. The fleshed and scoured skins are well washed in water, and are placed in a bath of lime-water, after which they are again washed, and are immersed successively in acidulated water, a solution of chloride of sodium, and a solution of alum. Various chlorides and alums may be used, but chloride of sodium and ordinary commercial alum, being cheap, are very suitable.

If preferred, a single bath containing the acid, the chloride, and the alum may be used. The skins are soaked in a warm aqueous solution of soap, and rinsed in water. For some purposes skins with the hair, wool, or fur on will now be sufficiently tanned.

The depilated skins are further treated in a bath of tungstate of soda, and then in a bath of carbonate of soda, or in a bath containing both salts. For some purposes the skins will now be sufficiently tanned, but for other purposes they may be treated with tannic acid. If it is desirable not to retain the oil or grease the skins are pressed, and in some cases the oil or grease is removed by means of a spirit, to which may be added an oil or substance which will give the leather an odor. If leather light in color be required metallic zinc is placed in the solutions of tungstate and carbonate of soda.

The strength of the solutions, the proportions of the agents, and the duration of the periods of treatment will vary according to the nature and thickness of the skins, and to the degree of tanning required.

By way of example, the processes for tanning thin skins, such as sheep, lamb, goat, kid, and rabbit skins, will be described. Such skins are agitated in water saturated with lime until any alkali remaining in the skins is neutralized, and are then rinsed in water. They are then immersed in water containing about six per cent., by weight, of sulphuric acid of ordinary commercial strength, and are agitated therein until the lime is neutralized. They are then agitated in a solution of chloride of sodium, containing about twenty per cent. of the salt, for a few minutes—say, for ten minutes or more—and are then removed into a solution of alum, containing about four per cent. of alum, in which they are agitated for a few minutes. They are then immersed in warm water, of a temperature of about 30° centigrade, and containing about ten per cent. of soap in solution, in which they are agitated until the soap is absorbed by the skins, or as long as considered suitable. The skins are then rinsed in water, and are afterward immersed in a solution of tungstate of soda, marking about 6° Twaddel.

If leather of light color be desired, zinc filings or zinc in small particles, amounting to about four per cent. of the said solution, is added. The skins are agitated in this solution for a few minutes—say, for ten minutes—and are then transferred to a solution of carbonate of soda, which should be saturated, or nearly so, zinc being present, if a light color is desired. The skins are treated in this solution as in the tungstate-of-soda solution. When a solution containing both salts is used, the solution of tungstate may first be made, and be saturated with carbonate of soda. If the oil or grease is to be discharged, the skins, either at this stage or previously to entering the bath of tungstate of soda, are submitted to hydraulic or other pressure, or the oil or grease is discharged by suitable means. To more effectually discharge the grease, the skins are, in some cases, washed in or treated with a solvent spirit, as, for example, with wood-naphtha or pyroxylic spirit, or corn or other alcoholic spirit, diluted with water.

To impart an odor to the leather, as in the case of Russia leather, birch oil or other suitable substance may be added to the spirit. For some uses the oil or grease is allowed to remain in the skins.

The leather produced by the process so far described will be found to be tanned and of a light color, the fibrin and gelatine being preserved more completely than by ordinary processes.

For some purposes it may be necessary to subject the skins to a further treatment in order to tan them more completely, in which case they are immersed in a liquid containing tannic acid—as, for example, in an infusion of bark, sumach, catechu, or other astringent, or be treated with the residuum from the process of refining oil ("foots.") The duration of this part of the treatment will vary according to the strength of the infusion, and as it may be desired to tan the skins partially or completely. For thin skins twenty minutes' treatment is about sufficient, thicker skins remaining in the infusion for a longer time. The thicker skins will also have to be treated for a longer time in the previous stages of the process.

When tanning a number of skins at once, they may remain longer in the baths or solutions than a few minutes, as it may not be convenient to remove them when exactly ready for removal.

The leather so produced will be found to have lost less weight and to be stronger as compared with leather produced by ordinary processes.

I claim—

1. The above-described process of removing the hair from skins—that is to say, subjecting the skins to the influence of a solution consisting of hydrate of lime, sulphide of barium, sulphide of arsenic, potash, and hydrosulphate of soda or other form of alkali, in about the proportions set forth.

2. The within-described process of tanning hides—that is to say, immersing them in a solution of lime and in one or successive solutions of sulphuric or other acid, chloride of sodium, and alum, as set forth.

3. The within-described process of tanning hides—that is to say, immersing them in solutions of sulphuric or other acid, chloride of sodium, alum, tungstate of soda, and carbonate of soda, substantially in the manner described.

4. The process herein described of tanning hides—that is to say, immersing them in solutions of sulphuric acid, chloride of sodium, and tannic acid.

J. L. DE MONTOISON.

Witnesses:
EDWARD K. DUTTON,
HUGH GRANT.